United States Patent [19]
Nakayoku et al.

[11] Patent Number: 5,743,093
[45] Date of Patent: Apr. 28, 1998

[54] RESERVOIR FOR MASTER CYLINDER

[75] Inventors: Nobuhisa Nakayoku; Jiro Suzuki; Masayuki Sugita, all of Wako; Kazuhiro Kosugi, Ueda, all of Japan

[73] Assignees: Nissin Kogyo Co., Ltd., Nagano-ken; Honda Giken Kogyo Kabushiki Kaisha, Tokyo, both of Japan

[21] Appl. No.: 688,783

[22] Filed: Jul. 31, 1996

[30] Foreign Application Priority Data

Aug. 2, 1995 [JP] Japan ................................. 7-197319

[51] Int. Cl.$^6$ .................................................. B60T 11/26
[52] U.S. Cl. .................................................. 60/585
[58] Field of Search .......................... 60/585, 586, 587, 60/588, 589

[56] References Cited

U.S. PATENT DOCUMENTS 5,349,820  9/1994  Yanagi et al. ........................... 60/585
5,493,863  2/1996  Yanagi et al. ........................... 60/585
5,647,212  7/1997  Coleman ................................. 60/585

*Primary Examiner*—Sheldon Richter
*Attorney, Agent, or Firm*—Nikaido, Marmelstein, Murray & Oram LLP

[57] ABSTRACT

An annular inward turned flange and a plurality of ribs are integrally molded on an inner peripheral surface of an cylindrical portion formed at an upper portion of a reservoir for a master cylinder. The ribs extend from a lower surface of the flange and are disposed in a distributed manner in a circumferential direction of the flange. An annular flat surface area is formed on an upper surface of the flange, and a tip end of a working oil filler is placed into close contact with the annular flat surface area. Thus, when a working oil is filled under pressure into the master cylinder and its output hydraulic pressure circuit through the reservoir by the working oil filler, the urging force from the working oil filler can be reliably supported, and the deformation of the reservoir by a filling pressure cannot be produced.

2 Claims, 7 Drawing Sheets

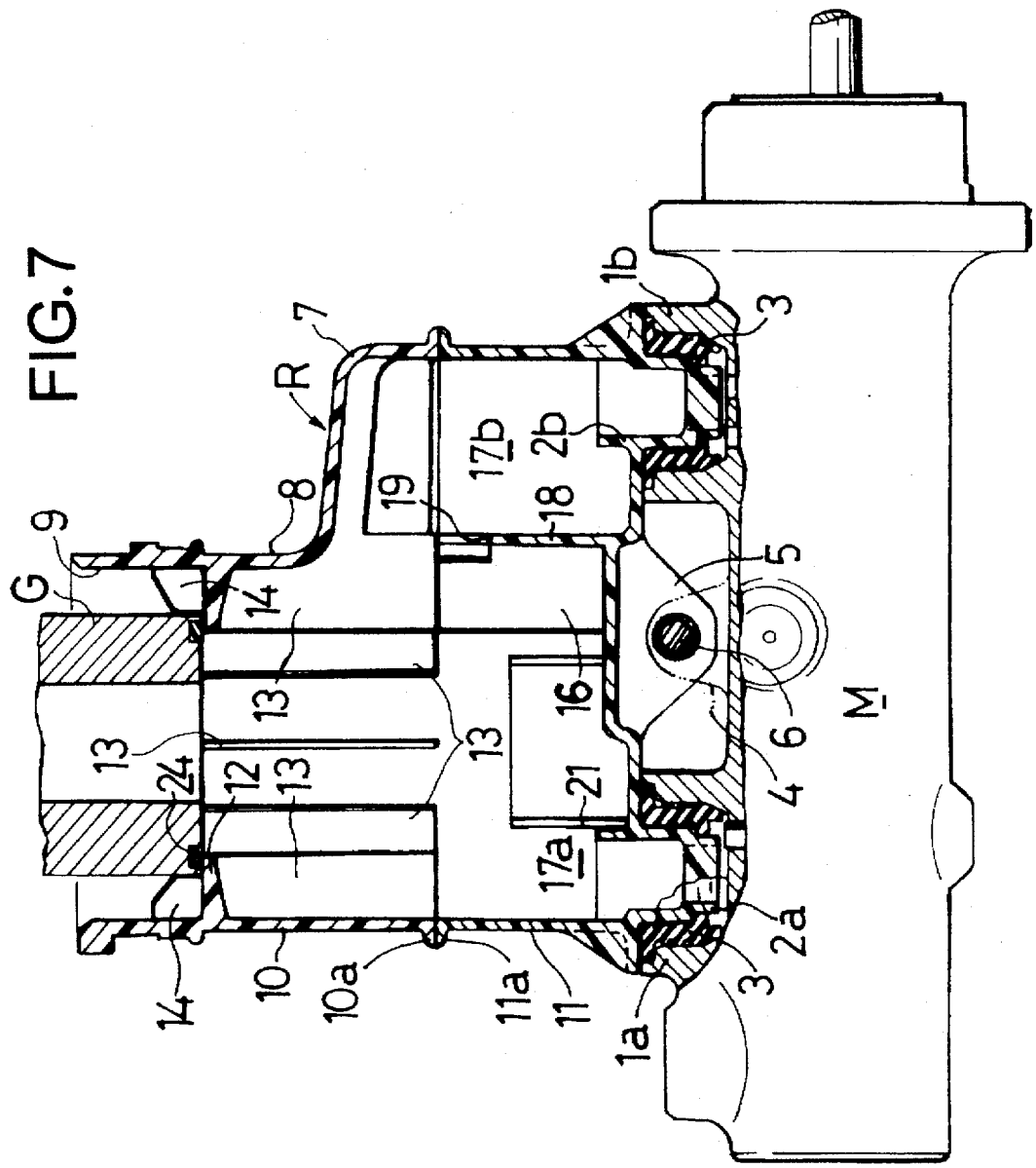

RESERVOIR FOR MASTER CYLINDER

BACKGROUND OF THE INVENTION

1. Field of the Invention

The present invention relates to a reservoir made of synthetic resin for a master cylinder, which is mounted on an upper portion of the master cylinder for operating a brake and/or a clutch in an automobile and in which a working oil stored.

2. Description of the Related Art

It is conventionally known that, to rapidly fill the working oil into the master cylinder and its output hydraulic pressure circuit in an assembling line for an automobile, an annular inward turned flange integrally molded on an inner peripheral surface of a reservoir is placed to abut against an upper end of an oil reservoir sleeve projectingly provided on an upper surface of the master cylinder and fitted into a lower portion of the reservoir, and a tip end of a working oil pressure-feeder inserted into the reservoir is brought into pressure contact with an upper surface of the inward turned flange, whereby the working oil can be filled under pressure into the oil reservoir sleeve of the master cylinder, as disclosed in Japanese Utility Model Publication No.59-3001.

In the above known technique, the working oil can be filled into the master cylinder without application of the filling pressure of the working oil to the reservoir and hence, it is possible to avoid the deformation of the reservoir made of synthetic resin by the filling pressure. However, such a method for rapidly filling the working oil can be applied only to a particular master cylinder/reservoir coupling structure in which the oil reservoir sleeve of the master cylinder is fitted into the lower portion of the reservoir.

Therefore, if the working oil filler is fitted into an oil supply opening in the reservoir to fill the working oil from the reservoir into the master cylinder, the working oil can be rapidly filled into the master cylinder irrespective of the structure of coupling between the master cylinder and reservoir, but there is a problem that the reservoir is deformed by the filling pressure.

SUMMARY OF THE INVENTION

Accordingly, it is an object of the present invention to prevent the reservoir from be deformed by the filling pressure, even if the working oil is filled into the master cylinder is carried out through the reservoir by the working oil filler.

To achieve the above object, according to the present invention, there is provided a reservoir made of synthetic resin for a master cylinder, which is mounted to the master cylinder and in which a working oil of the master cylinder is stored, the reservoir comprising: an inward turned flange integrally molded on an inner peripheral surface of the reservoir to protrude radially inwardly from the middle of the inner peripheral surface, and a plurality of lower ribs also integrally molded on the inner peripheral surface of the reservoir to extend downwardly from the inward turned flange and disposed in a distributed manner in a circumferential direction of the flange, the inward turned flange being formed, on an upper surface thereof, with an annular flat surface area, with which a tip end of a working oil filler is closely contacted.

With such arrangement, in the reservoir made of synthetic resin for the master cylinder, which is mounted to the master cylinder and in which the working oil is stored, the inward turned flange integrally molded on an inner peripheral surface of the reservoir to protrude radially inwards from the middle of such inner peripheral surface, and a plurality of lower ribs also integrally molded on the inner peripheral surface of the reservoir to extend downwards from the inward turned flange and disposed in the distributed manner in the circumferential direction of the flange, the inward turned flange being formed, on its upper surface, with the annular flat surface area, with which a tip end of a working oil filler is placed into close contact. Therefore, the working oil can be filled under pressure into the master cylinder and its output hydraulic pressure circuit through the reservoir by the working oil filler by utilizing the inward turned flange at the cylindrical portion of the reservoir. Thus, it is possible to rapidly fill the working oil irrespective of the structure of coupling between the reservoir and the master. Moreover, the inward turned flange reliably supports the urging force from the working oil filler and cannot be deformed, because it is effectively reinforced by the lower ribs, but also effectively reinforces the peripheral wall of the reservoir and hence, it is possible to prevent the reservoir from being deformed by the filling pressure of the working oil.

In addition to the above arrangement, a plurality of upper ribs are integrally molded on the inner peripheral surface of the reservoir to extend from the upper surface of the inward turned flange to the vicinity of an oil supply opening located above the upper surface of the inward turned flange and disposed in a distributed manner in the circumferential direction of the flange, and wherein the annular flat surface area is left on the upper surface of the inward turned flange at a location near its inner periphery. Thus, a pressure contact for the working oil filler can be left on the inward turned flange, thereby ensuring that the flange can be further reinforced by the upper ribs to stabilize the supporting of the working oil filler and to prevent an expanding deformation of the oil supply opening by the upper ribs.

The above and other objects, features and advantages of the invention will become apparent from a preferred embodiment taken in conjunction with the accompanying drawings.

BRIEF DESCRIPTION OF THE DRAWINGS

FIG. 7 is a view for explaining the outline for filling a working oil into a reservoir by a working oil filler.

DETAILED DESCRIPTION OF THE PREFERRED EMBODIMENT

The present invention will now be described by way of a preferred embodiment with reference to the accompanying drawings.

Figure 1:
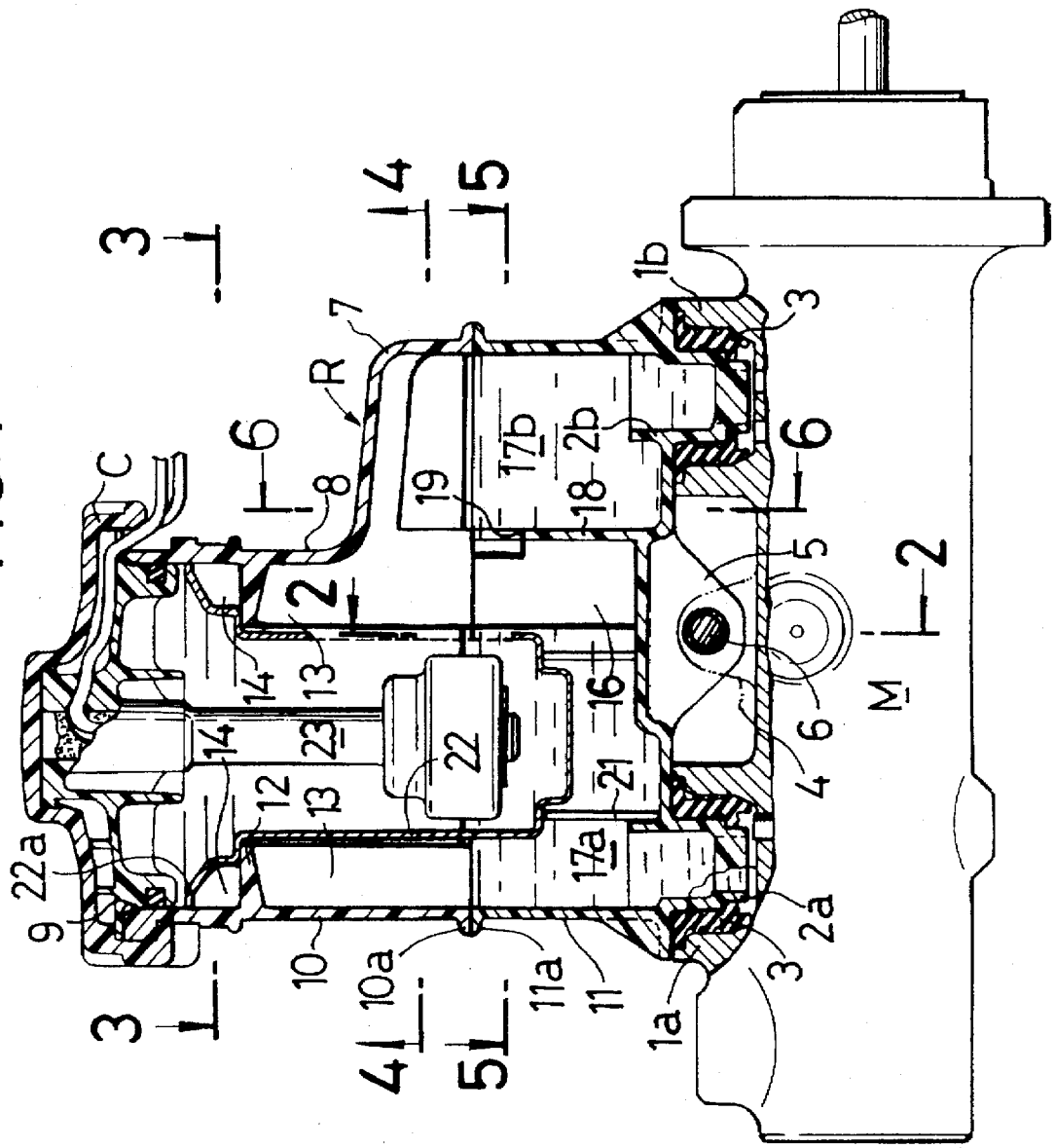
FIG. 1 is a vertical sectional side view of a reservoir according to the present invention in a coupled relation to a master cylinder.

Referring first to FIG. 1, a pair of front and rear introduction bosses 1a and 1b are projectingly provided on an upper surface of a tandem type master cylinder M. A pair of front and rear discharge pipes 2a and 2b are projectingly provided on a lower surface of a reservoir R and fitted into the introduction bosses 1a and 1b with a grommet-like seal member 3 interposed therebetween, respectively. A working oil stored in the reservoir R is supplied from the discharge pipes 2a and 2b through the introduction bosses 1a and 1b into front and rear independent hydraulic pressure chambers in the master cylinder M.

Figure 2:
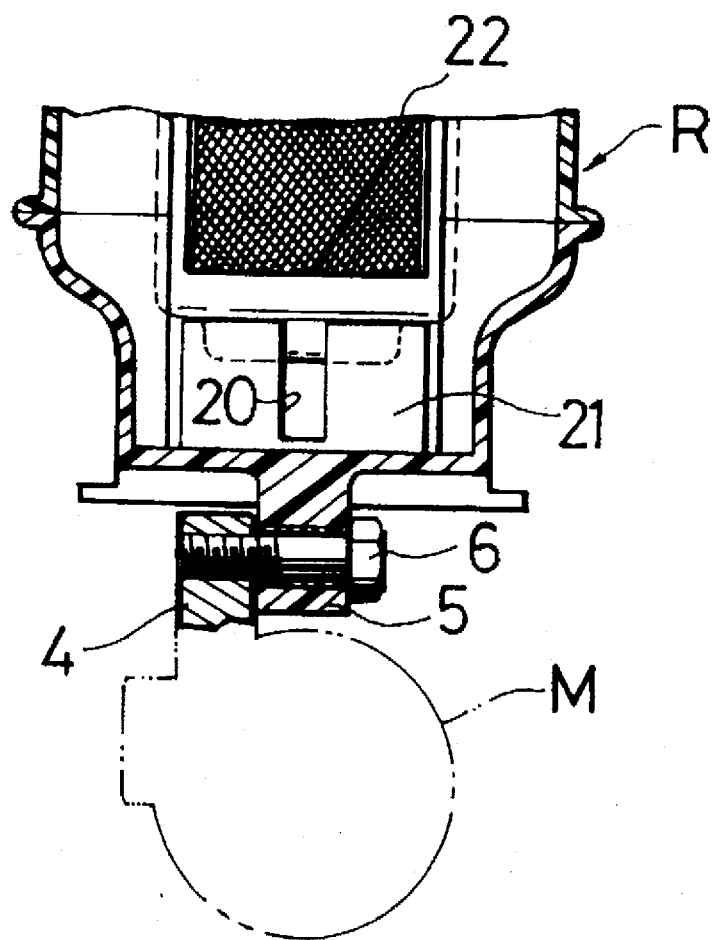
FIG. 2 is a sectional view taken along the line 2—2 in FIG. 1.

Connecting arms 4 and 5 having one sides superposed on each other are projectingly provided on opposed surfaces of the master cylinder M and the reservoir R, respectively. The fitted states of the discharge pipes 2a and 2b and the introduction bosses 1a and 1b are maintained by connecting the connecting arms 4 and 5 to each other by a bolt 6 (see FIG. 2).

The reservoir R includes a box-like portion which has the discharge pipes 2a and 2b on a bottom wall thereof and which is elongated in a direction of arrangement of the discharge pipes 2a and 2b, and a cylindrical portion 8 risen from a ceiling wall of the box-like portion 7. The cylindrical portion 8 opens at its upper end as an oil supply opening, and a cap C is a bayonet-coupled to such opening.

The reservoir R is initially divided in the middle of the box-like portion into an upper block 10 and a lower block 11. Both the blocks 10 and 11 are molded individually and coupled to each other by welding flanges 10a and 11a formed on division end faces of the blocks 10 and 11, to each other.

Figure 3:
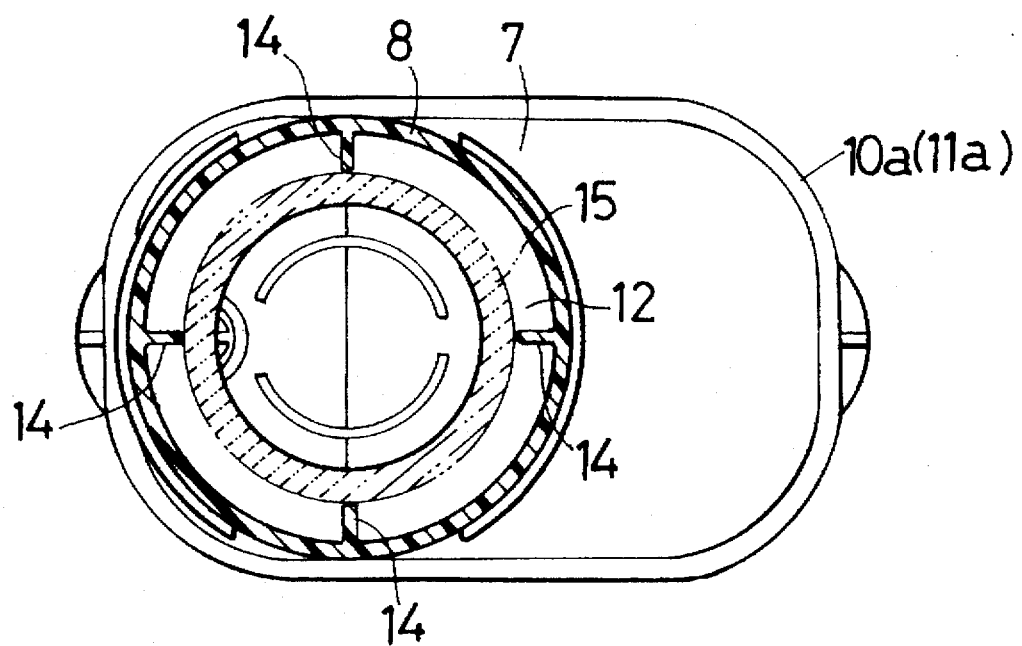
FIG. 3 is a sectional view taken along the line 3—3 in FIG. 1.
Figure 4:
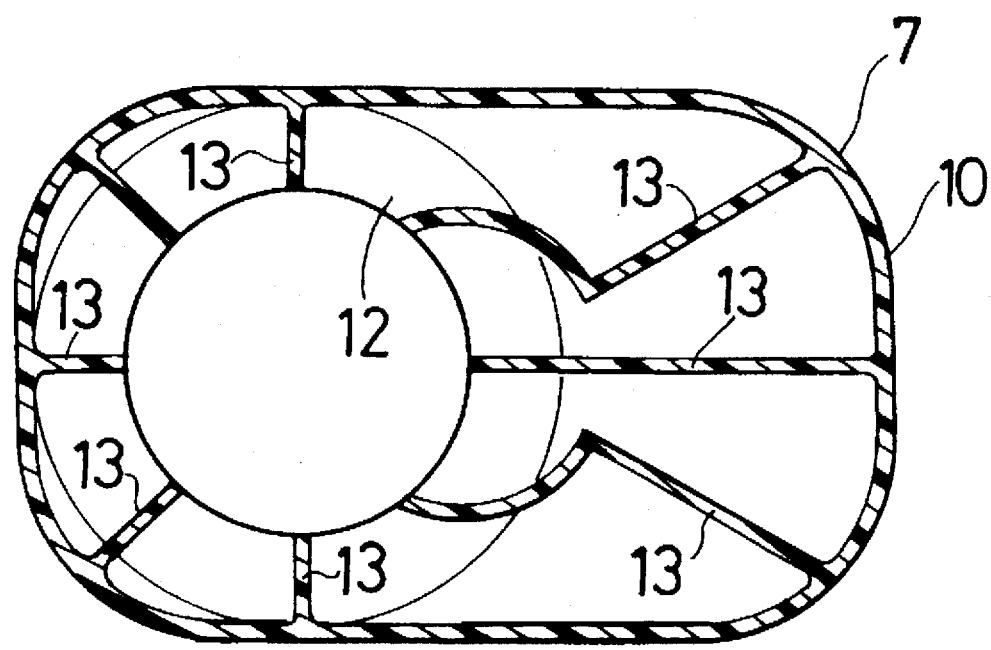
FIG. 4 is a sectional view taken along the line 4—4 in FIG. 1.

As shown in FIGS. 1, 3 and 4, the upper block 10 is integrally provided with an annular inward-turned flange 12 protruding radially inwards in the middle of the cylindrical portion 8, a plurality of lower ribs 13 extending from a lower surface of the inward-turned flange 12 to a lower end of the upper block 10 and disposed in a distributed manner in a circumferential direction of the flange 12, and a plurality of upper ribs 14 extending from an upper surface of the inward-turned flange 12 to the vicinity of the oil supply opening 9 and disposed radially. These flange 12 and the lower and upper ribs are integrally molded on the inner peripheral surface of the upper block 10. In this case, an annular flat surface area 15 (an obliquely lined portion in FIG. 3), which is not interfered by the upper ribs 14, is left on the upper surface of the inward turned flange 12. This flat surface area 15 is placed into close contact by a tip end of a working oil filler G (see FIG. 7) to carry the latter.

Figure 5:
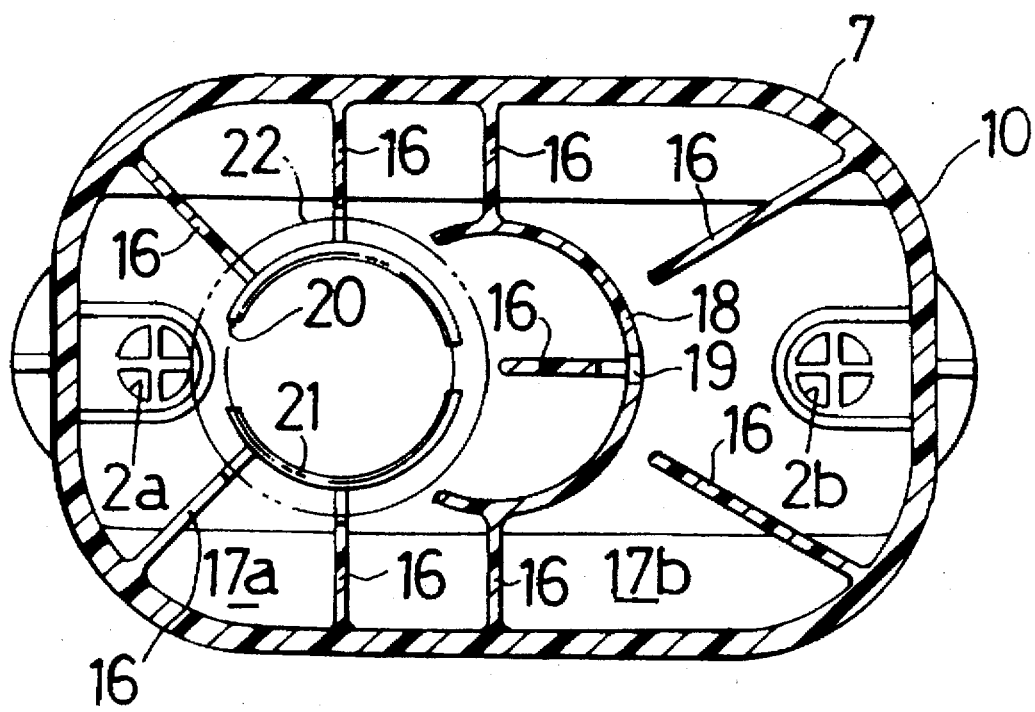
FIG. 5 is a sectional view taken along the line 5—5 in FIG. 1.

As shown in FIGS. 1 and 5, a plurality of lower ribs 16 are integrally molded on the inner peripheral surface of the lower block 11, and are risen from the bottom wall of the lock block 11 and welded to some of the lower ribs 13.

Figure 6:
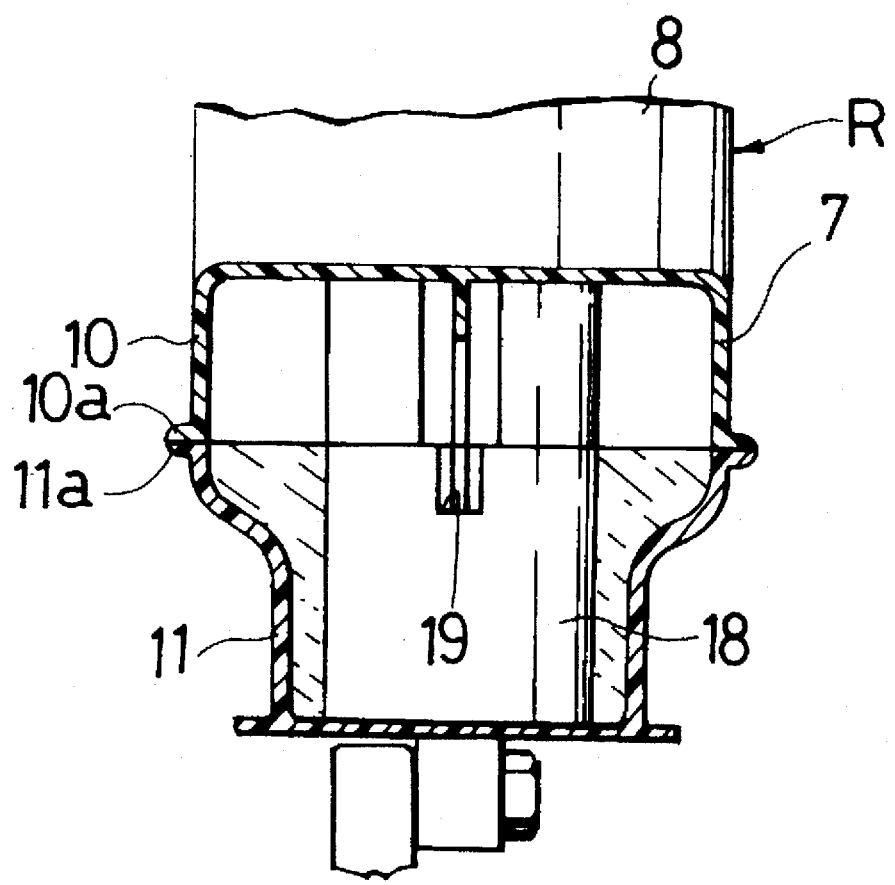
FIG. 6 is a sectional view taken along the line 6—6 in FIG. 1.

Further, a partition wall 18 is integrally molded in the reservoir R for dividing the inside of the box-like portion 7 into a front chamber 17a and a rear chamber 17b by cooperation with some of the lower ribs 13 and 16. The partition wall 18 has a weir 19 (see FIG. 6) which permits both the chambers 17a and 17b to communication with each other at a predetermined level. The front chamber 17a is connected to the cylindrical portion 8 and the front discharge pipe 2a, while the rear chamber 17b is connected to the rear discharge pipe 2b. Therefore, if the working oil is injected into the reservoir R through the oil supply opening 9, the working oil, after filling the front chamber 17a, can be passed over the weir 19 to fill the rear chamber 17b. Thus, even if a defect is arisen in one of two output hydraulic pressure circuits in the master cylinder M, thereby causing the working oil to flow out from one of the chambers 17a and 17b, a predetermined amount of the working oil can be kept stored in the other chamber connected to the normal hydraulic pressure circuit.

A risen cylindrical support sleeve 21 having a notch 20 is integrally molded on the bottom wall of the box-like portion 7, and a cylindrical oil filter 22 is inserted into the cylindrical portion 8 and carried at its bottom on the support sleeve 21. An outward turned flange 22a is formed on an upper end of the oil filter 22 and carried on upper ends of the plurality of upper ribs 14.

A known float switch 23 is disposed in the filter 22 and adapted to detect a state in which the amount of working oil remaining within the reservoir R to operate an external warning lamp (not shown). The switch 23 is supported under the cap C.

To rapidly fill the working oil into the mater cylinder M and its output hydraulic pressure circuit in an assembling line for automobile, the cap C and the oil filter 22 are first removed from the reservoir R, as shown in FIG. 7, and the tip end of the working oil filler G inserted into the oil supply opening 9 in the reservoir R is urged into close contact with the annular flat surface area 15 of the inward turned flange 12 with the seal member 24 interposed therebetween. Then, the working oil filler G is operated to charge the working oil under pressure into the reservoir R, whereby the working oil can be rapidly filled into the master cylinder M through the reservoir R.

At this time, the inward turned flange 12 cannot be deformed and can be reliably supported, even if it receives a large urging force from the working oil filler G, because the inward turned flange 12 is reinforced by the lower ribs 13 and the upper ribs 14 coupled to the inner peripheral surface of the reservoir R.

Moreover, it is possible to prevent the deformation of the reservoir R by the filling pressure of the working oil, because the peripheral wall of the cylindrical portion 8 is reinforced by the inward turned flange 12 and the peripheral wall of the box-like portion 7 is reinforced by the coupling flanges 10a and 11a. Further, the upper ribs 14 contribute to even the prevention of the expanding deformation of the oil supply opening 9 by cooperation with the inward turned flange 12.

Although the embodiment of the present invention has been described in detail, it will be understood that the present invention is not limited to the above-described embodiment, and various modifications in design may be made without departing from the subject matter and scope of the invention defined in claims.

What is claimed is:

1. A reservoir made of synthetic resin for a master cylinder, which is mounted to the master cylinder and in which a working oil of the master cylinder is stored, said reservoir comprising:

an inward turned flange integrally molded on an inner peripheral surface of said reservoir to protrude radially inwardly from the middle of said inner peripheral surface, and a plurality of lower ribs also integrally molded on the inner peripheral surface of said reservoir to extend downwardly from said inward turned flange and disposed in a distributed manner in a circumferential direction of said flange, said inward turned flange being formed, on an upper surface thereof, with an annular flat surface area, with which a tip end of a working oil filler is closely contacted.

2. A reservoir for a master cylinder according to claim 1, further including a plurality of upper ribs which are integrally molded on the inner peripheral surface of said reservoir to extend from the upper surface of said inward turned flange to the vicinity of an oil supply opening located above the upper surface of said inward turned flange and disposed in a distributed manner in the circumferential direction of said flange, and wherein said annular flat surface area is left on the upper surface of said inward turned flange at a location near its inner periphery.

* * * * *